US008341543B2

(12) United States Patent
Shah

(10) Patent No.: US 8,341,543 B2
(45) Date of Patent: *Dec. 25, 2012

(54) METHOD AND APPARATUS OF SCROLLING A DOCUMENT DISPLAYED IN A BROWSER WINDOW

(75) Inventor: Roma Shah, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,439

(22) Filed: Sep. 26, 2011

(65) Prior Publication Data

US 2012/0266104 A1 Oct. 18, 2012

Related U.S. Application Data

(63) Continuation of application No. 13/087,914, filed on Apr. 15, 2011.

(51) Int. Cl.
*G06F 3/048* (2006.01)
*G06F 17/00* (2006.01)

(52) U.S. Cl. ........ 715/784; 715/786; 715/802; 715/838; 715/273; 715/200

(58) Field of Classification Search ............... 715/784, 715/274, 802, 786, 790, 838, 273, 200
See application file for complete search history.

(56) References Cited

U.S. PATENT DOCUMENTS

| | | | | |
|---|---|---|---|---|
| 5,781,785 A * | 7/1998 | Rowe et al. | ...... | 715/234 |
| 6,457,026 B1 * | 9/2002 | Graham et al. | ...... | 715/234 |
| 7,689,933 B1 * | 3/2010 | Parsons | ...... | 715/838 |
| 8,140,975 B2 * | 3/2012 | Lemay et al. | ...... | 715/730 |
| 2005/0262450 A1 * | 11/2005 | Sauermann | ...... | 715/784 |
| 2008/0288894 A1 * | 11/2008 | Han et al. | ...... | 715/855 |
| 2010/0235794 A1 | 9/2010 | Ording | | |
| 2011/0145752 A1 | 6/2011 | Fagans | | |

OTHER PUBLICATIONS

BCLUWHighSchool, "Working with pdf files on a Mac," YouTube video, http://www.youtube.com/watch?v=HM234X64UAc&feature=related, Aug. 19, 2010 (last visited Aug. 17, 2012).
BCLUWHighSchool, Screenshots of the YouTube video entitled "Working with pdf files on a Mac," http://www.youtube.com/watch?v=HM234X64UAc&feature=related, Aug. 19, 2010, 2 pages.

* cited by examiner

*Primary Examiner* — Ting Lee

(57) ABSTRACT

Methods and systems for performing a scroll operation are disclosed. A method may include displaying a first page of a portable document format (pdf) document on a browser window, associating respective thumbnails with each of the pages in the pdf document, and displaying two or more of the respective thumbnails overlaid on the first page. The method may also include receiving an indication to scroll the pdf document in a first direction, scrolling the pages of the pdf document at a first rate in the first direction, and scrolling the respective thumbnails of each of the pages at a second rate, different than the first rate, in the first direction. The varying scroll rate of the document and its corresponding thumbnails provides the user with different viewing options to view the document when performing a scrolling operation.

8 Claims, 4 Drawing Sheets

METHOD AND APPARATUS OF SCROLLING A DOCUMENT DISPLAYED IN A BROWSER WINDOW

CROSS-REFERENCE

This application is a continuation of U.S. application Ser. No. 13/087,914, filed Apr. 15, 2011, which is hereby incorporated herein in its entirety.

BACKGROUND

1. Technical Field

The field relates to operating systems, software applications and user interface devices, and, more particularly, to a system, method, apparatus or non-transitory computer program product for displaying a scrollable document in a browser window that permits varying scroll rates of corresponding display content.

2. Background

Applications are commonly used with computational devices, such as, laptops, smartphones, tablet computing devices, personal digital assistants (PDAs), etc. Applications allow a user to access information sources, webpages, games, and other virtual tools. Applications are usually accessed and viewed in a display browser window. Navigation tools commonly associated with a browser window generally include a scroll bar, address window, main display area and other additional tabs and display options.

In one example of operating a computing device, a user may access a document via his or her smartphone device. When accessing the document, the user may select a particular desktop icon, such as a browser icon, and launch a particular application, such as a browser application, and download the document from a remote location. Alternatively, the document may already be downloaded on the user's smartphone and may be accessed by a user initiated selection operation. Once the user has opened the document in a browser window, the browser may provide a default display configuration for the document to be viewed, navigated, manipulated, modified, etc.

The display size of the document is limited by the size of the user display window. The document may span multiple pages and may be viewable only one page at a time. Furthermore, the limited viewing space on the newer pocket and travel-sized display devices requires increasingly simple and prompt viewing options for the users' satisfaction.

BRIEF SUMMARY

In an embodiment, a computer-implemented method may include certain operations to display and scroll a document. Operations may include displaying a first page of a portable document format (pdf) document on a browser window, associating respective thumbnails with each of a plurality of pages in the pdf document, and displaying two or more of the respective thumbnails overlaid on the first page. Other operations of the method may include receiving an indication to scroll the pdf document in a first direction, scrolling the plurality of pages of the pdf document at a first rate in the first direction, and scrolling the respective thumbnails of each of the plurality of pages at a second rate, different than the first rate, in the first direction.

Another embodiment may include a system that includes a scroll adjustor, implemented with a computing device, configured to perform certain operations. The operation may include to display a first page of a portable document format (pdf) document on a browser window, associate respective thumbnails with each of a plurality of pages in the pdf document, and display two or more of the respective thumbnails overlaid on the first page. Further operations may include to receive an indication to scroll the pdf document in a first direction, scroll the plurality of pages of the pdf document at a first rate in the first direction, and scroll the respective thumbnails of each of the plurality of pages at a second rate, different than the first rate, in the first direction.

Further embodiments, features, and advantages of the invention, as well as the structure and operation of the various embodiments of the invention are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments described herein refer to illustrations with reference to particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1A:
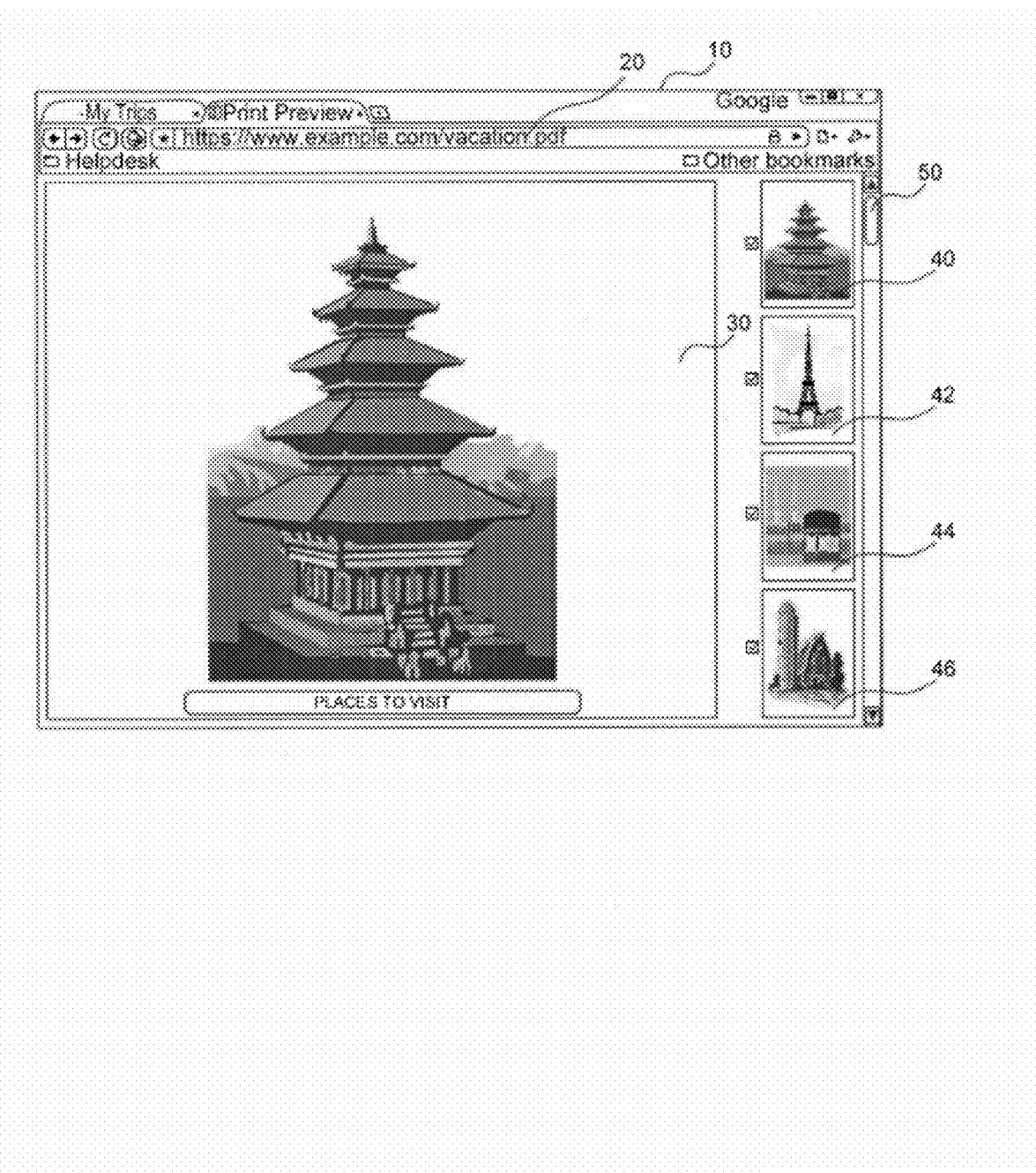
FIG. 1A is an illustration of an example browser window displaying a document, according to an example embodiment.

FIG. 1A illustrates an example browser window displaying a document, according to an example embodiment. Referring to FIG. 1A, the browser window 10 is illustrated as displaying the contents of a document that have been opened by a user selection operation. The user may download a document from the Internet, a remote file server, to their computing device via a document receiving application, such as an email application. The document may be downloaded and selected for viewing either at separate times or contemporaneously. The user may select the document by an icon or thumbnail indicator associated with the document that is displayed on the user's display device. The selection operation may include selecting to open the file for viewing by selecting an open feature, or by performing a selection operation on a mouse device or touch pad/touch screen device. As a result, the document may open and appear viewable to the user via a browser plug-in or a browser-based document format.

Referring to the browser window 10, FIG. 1A further illustrates an address bar or document indication field 20 along with a variety of adjacent user options related to the browser 10 (e.g., refresh, helpdesk, bookmarks, tools, etc.). In this example, the document has been opened for viewing on a primary portion of the browser display area 30. The first page of the document is shown as a destination vacation photograph that has been formatted as part of a document entitled "vacation.pdf." The document includes images as well as text and spans multiple pages; however, only one page is presently viewable. As part of the same browser window, a column of icons or thumbnails 40, 42, 44 and 46 are also illustrated as preview windows corresponding to the content of the main display area or the primary portion of the browser display area 30.

The thumbnails 40-46 are indicative of the content of the pages of the document, and provide the user with a view of the next three pages, in addition to the current page being displayed. The number of viewable thumbnails may vary depending on the display size and display type, and may also vary depending on user defined preferences. However, by increasing the number of thumbnails that are displayed in any given display area, the viewable preview content area of the thumbnails will decrease along with the size of the thumbnails.

A user may scroll downward from the first page to view additional pages of the document's contents. As illustrated in FIG. 1A, the first page illustrates a photograph of the five-story Pagoda "Nyatapola" in Nepal. The additional pages are illustrations of other famous buildings and destinations across the globe. The user may desire to travel to Europe, in which case, the Eiffel tower 42 on page two of the document provides a preview of the content of page two. The contents of page 2 are viewable without having to navigate away from page one to view the preview of page 2. In general, documents may have large numbers of pages. Assuming the present document had over 50 pages, and the user wanted to preview the entire document in a time efficient manner, the user may desire to scroll through the smaller thumbnails since more than one thumbnail is displayed at any given time. For instance, if four thumbnails are presented by default across the length of a single displayed page, then the thumbnails may provide a preview option that is four times as efficient as viewing the content of the present page 30 on the main display area.

Figure 1B:
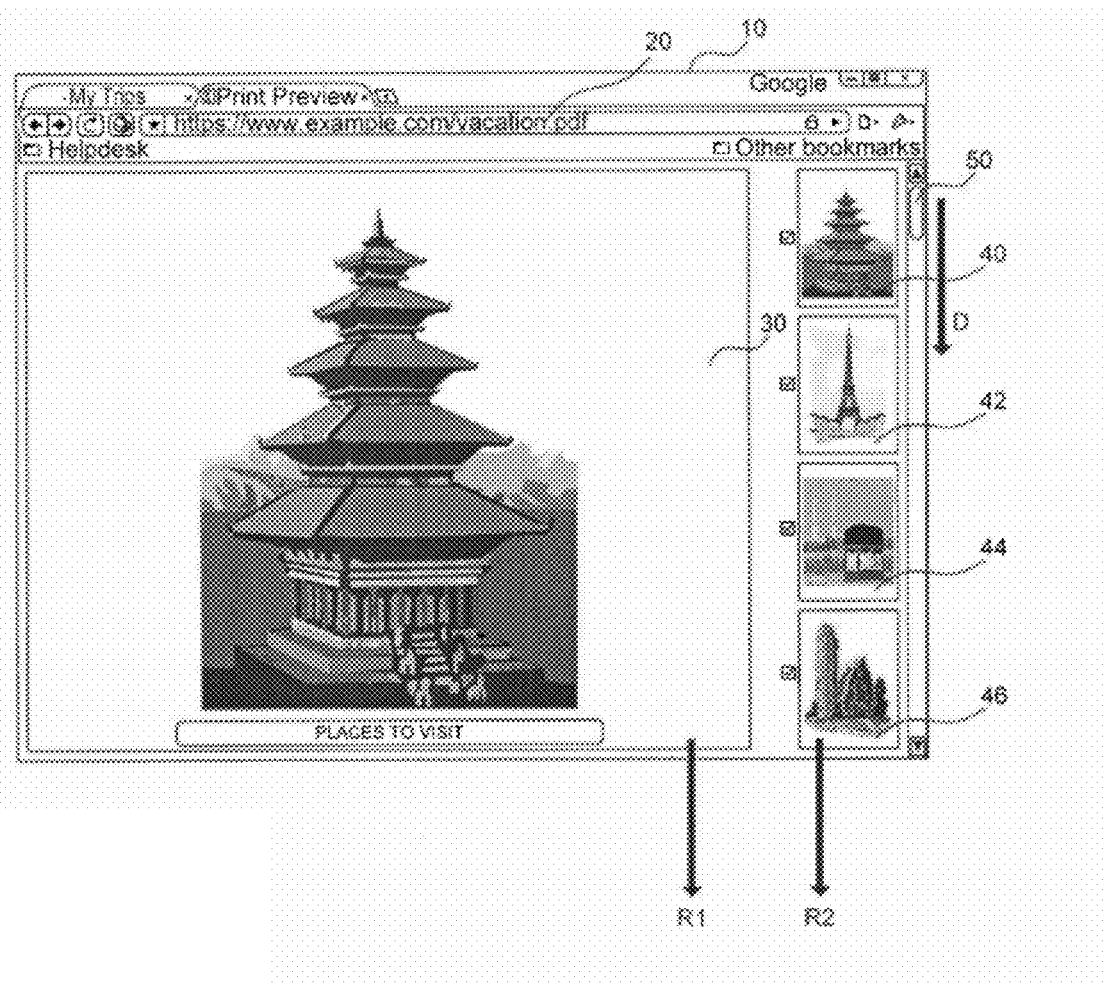
FIG. 1B is an illustration of an example browser window displaying a document being scrolled, according to an example embodiment.

FIG. 1B discloses details of the operation of the scroll bar feature, according to an example embodiment. Referring to FIG. 1B, the user may select the scroll bar 50 and move the scroll bar in a downward direction "D" indicating that the user desires to view the content on the next page(s) of the document. As a result of the scrolling operation, the next page of the document may appear in the primary viewing area of the browser window and the previous page may no longer be viewable. Additional thumbnails may also appear as new previews of subsequent document pages. The new thumbnails may appear to the user as previously displayed thumbnails are cycled away from the viewing area. Although the thumbnails and the main display area are part of the same document and corresponding viewing area, the scroll rate of change may vary from the main display area as compared to the preview thumbnail area. In other words, while scrolling through the document's contents, the content of the main display area may change at a different rate from the content of the thumbnails display area.

The scrolling of the main display area and the thumbnail display area may be performed simultaneously by using the scroll bar 50. However, the rate of change of the main display area (R1) and the rate of change of the thumbnail display area (R2) may vary by default. Assuming that the user desires to obtain a preview of the entire document in the most time effective manner without missing any of the document's content, then, it may be prudent to slow the rate of change of the thumbnail portion of the browser window (the rightmost portion of the browser). The rate of change when scrolling may vary according to user preferences. Examples of the rate of change may include R1 changing twice as fast, three times as fast, four times as fast, five times as fast, six times as fast, seven times as fast, eight times as fast, etc., as the rate of change of R2, and vice versa.

By slowing the rate of change of the thumbnail portion of the browser window, the user may be able to view four or more preview pages at one time, to see if any of the images or headlines included in the thumbnails are of interest. The remaining main portion of the display area scrolls faster as the image is shown to be significantly larger than the size of the thumbnails. As a result of the faster scrolling of the main display area, the main display area may produce blurry data during the scrolling process. However, if the user is currently viewing the thumbnails to obtain a snapshot of the entire document, then the blurred content of the main display area is irrelevant as the thumbnails are the current target of the user's interest.

Thumbnails, such as, 40, 42, 44, 46 and onward, that may be scrolled at a different rate than the pages themselves help a user identify the pages faster when performing a scrolling operation. Additionally, numbers can be overlaid on the thumbnails to further help identify the page numbers. The example document discussed above may be a portable document file format (*.pdf), which is known to provide image and text data in a single document format. Other document formats may also be used when performing the above-noted scrolling operation (HTML, SingleFile, MHTML, MAFF, etc.). The viewable area of the thumbnails may be a separate column or row from the main display area of the document, however, both the main display area and the thumbnail display area may be part of the same window browser regardless of their respective scroll rates. Also, an opposite scroll rate scenario may be enacted to provide a slower scroll rate of the main display area, while the thumbnails may be scrolled much faster, assuming a user desires to view the content in greater detail by viewing the main display area, while scrolling down the document. In another example, thumbnails 40, 42, 44, and 46 and onward may be overlaid over image 30. In such a case, the thumbnail may become semi-transparent. Overlaid is defined as putting one object on top of another. For example, a thumbnail can be overlaid on an image. The thumbnail is then placed on top of the image.

Figure 2:
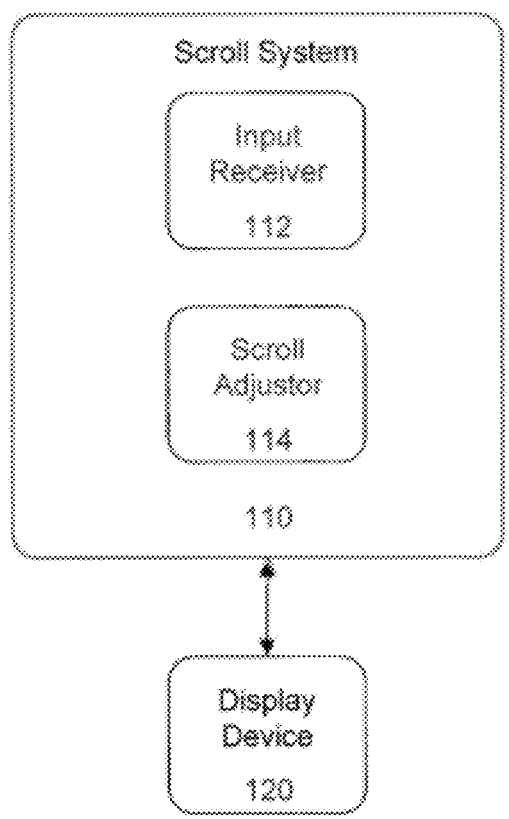
FIG. 2 is an illustration of a scroll system, according to an example embodiment.

FIG. 2 is a block diagram of an exemplary scroll system 110 configured to perform a scroll operation, according to an embodiment. System 110, or any combination of its components, may be part of or may be implemented with a computing device. Examples of computing devices include, but are not limited to, a computer, workstation, distributed computing system, computer cluster, embedded system, stand-alone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

System 110 may include an input receiver 112 and a scroll adjustor component 114. The system 110 is in communication with a display device 120, which may be used to display any of the example display configurations discussed in detail above. The input receiver 112 may receive a command to begin a scroll operation, the input may include document information (document type), user scrolling direction information, rate of change information R1 and/or R2 of the scroll bar, etc. and/or other predefined displaying information. The scroll adjustor 114 may use the command and input information to begin scrolling the document at two different rates.

One scroll rate may be faster than the other scroll rate. One scroll rate may be corresponding to the main display area of the document and the other scroll rate may be corresponding to the thumbnail preview area of the document. Examples of the embodiments for exemplary system 110 or subsystem components, such as, input receiver 112 and scroll adjustor 114, and methods or any parts or function(s) thereof may be implemented using hardware, software modules, firmware, tangible computer readable or computer usable storage media having instructions stored thereon, or a combination thereof and may be implemented in one or more computer systems or other processing systems.

Figure 3:
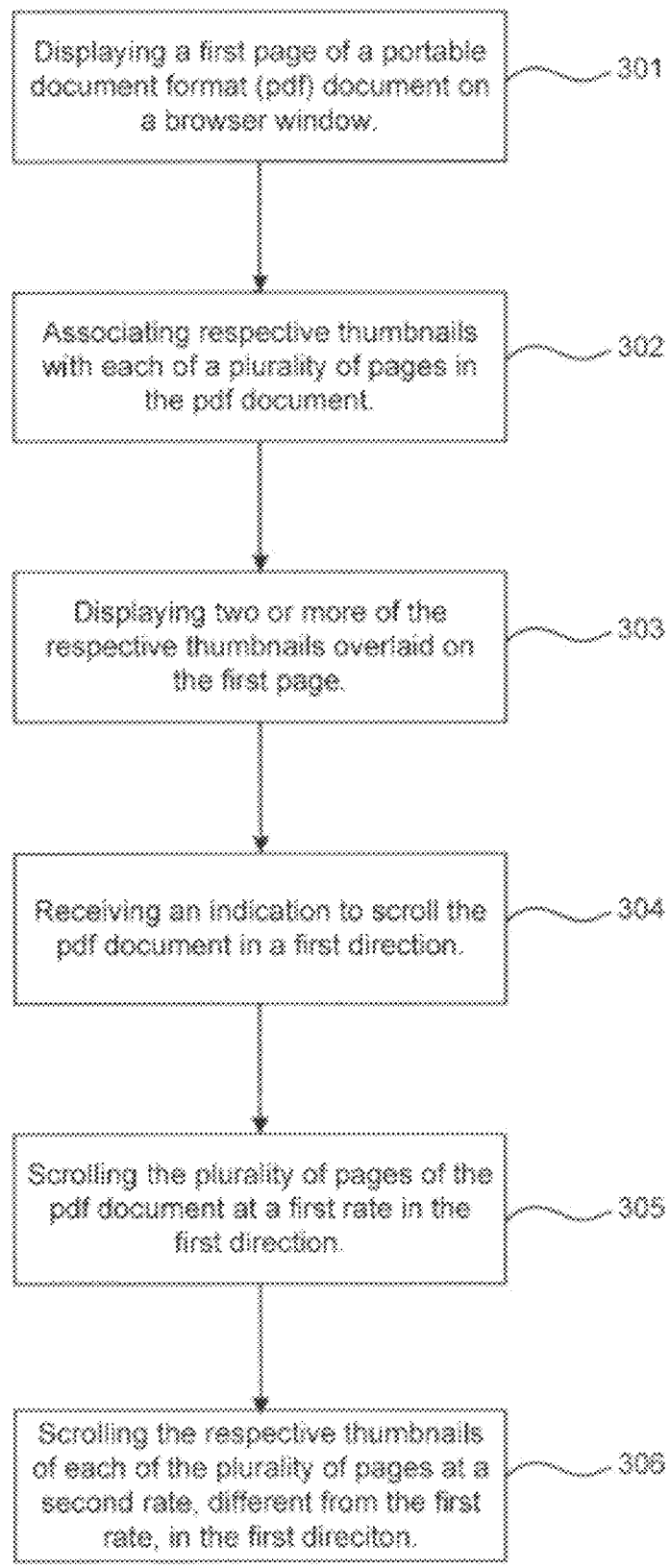
FIG. 3 is an illustration of a flow diagram of an example method of operation, according to an example embodiment.

FIG. 3 is an illustration of a flow diagram of an example method of operation, according to an example embodiment. Referring to FIG. 3, the method may include displaying a first page of a portable document format (pdf) document on a browser window, at step 301. At step 302, respective thumbnails are associated with each of a plurality of pages in the pdf document. Two or more of the respective thumbnails are displayed overlaid on the first page, at step 303. An indication to scroll the pdf document in a first direction is received at step 304. The plurality of pages of the pdf document are scrolled at a first rate in the first direction at step 305. The respective thumbnails of each of the plurality of pages are scrolled at a second rate, different than the first rate, in the first direction, at step 306.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described exemplary embodiments.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-implemented method, comprising:
displaying a first page of a document on a browser window;
associating respective thumbnails with each of a plurality of pages in the document;
displaying two or more of the respective thumbnails in combination with the first page;
receiving a single indication to scroll both the plurality of pages in the document and the respective thumbnails at difference rates in a first direction; and
in response to receiving the single scroll indication, scrolling simultaneously:
the plurality of pages of the document at a first rate in the first direction, and the respective thumbnails of each of the plurality of pages at a second rate, greater than the first rate, in the first direction,
thereby enabling content in the plurality of pages to be viewed in greater detail while more rapidly scrolling the thumbnails.

2. The method of claim 1, wherein a respective page number is displayed on top of each respective thumbnail.

3. The method of claim 1, wherein displaying two or more of the respective thumbnails in combination with the first page comprises:
displaying two or more of the respective thumbnails on a right side or a left side of the document as viewed by a user.

4. The method of claim 1, wherein displaying two or more of the respective thumbnails in combination with the first page comprises:
adjusting the transparency of two or more of the respective thumbnails such that the two or more respective thumbnails are semi-transparent; and
displaying the two or more respective thumbnails overlaid on the first page.

5. A system, comprising:
one or more processors; and
a scroll adjustor, implemented with a computing device, configured to:
display a first page of a document on a browser window,
associate respective thumbnails with each of a plurality of pages in the document,
display two or more of the respective thumbnails in combination with the first page,
receive a single indication to scroll both the plurality of pages in the document and the respective thumbnails at difference rates in a first direction,
in response to receiving the single scroll indication, scroll simultaneously:
the plurality of pages of the document at a first rate in the first direction,
and the respective thumbnail of each of the plurality of pages at a second rate greater than the first rate, in the first direction, thereby enabling content in the plurality of pages to be viewed in greater detail while more rapidly scrolling the thumbnails.

6. The system of claim 5, wherein a respective page number is displayed on top of each respective thumbnail.

7. The system of claim 5, wherein the scroll adjustor is further configured to:

display two or more of the respective thumbnails on a right side or a left side of the document as viewed by a user.

8. The system of claim 5, wherein the scroll adjuster is further configured to:

adjust the transparency of two or more of the respective thumbnails such that the two or more respective thumbnails are semi-transparent; and display the two or more respective thumbnails overlaid on the first page.

\* \* \* \* \*